Sept. 5, 1939.    LE ROY U. SPENCE    2,171,809
METHOD OF DETERMINING THE PURITY OF TRIMETHYLAMINE
Filed April 29, 1938
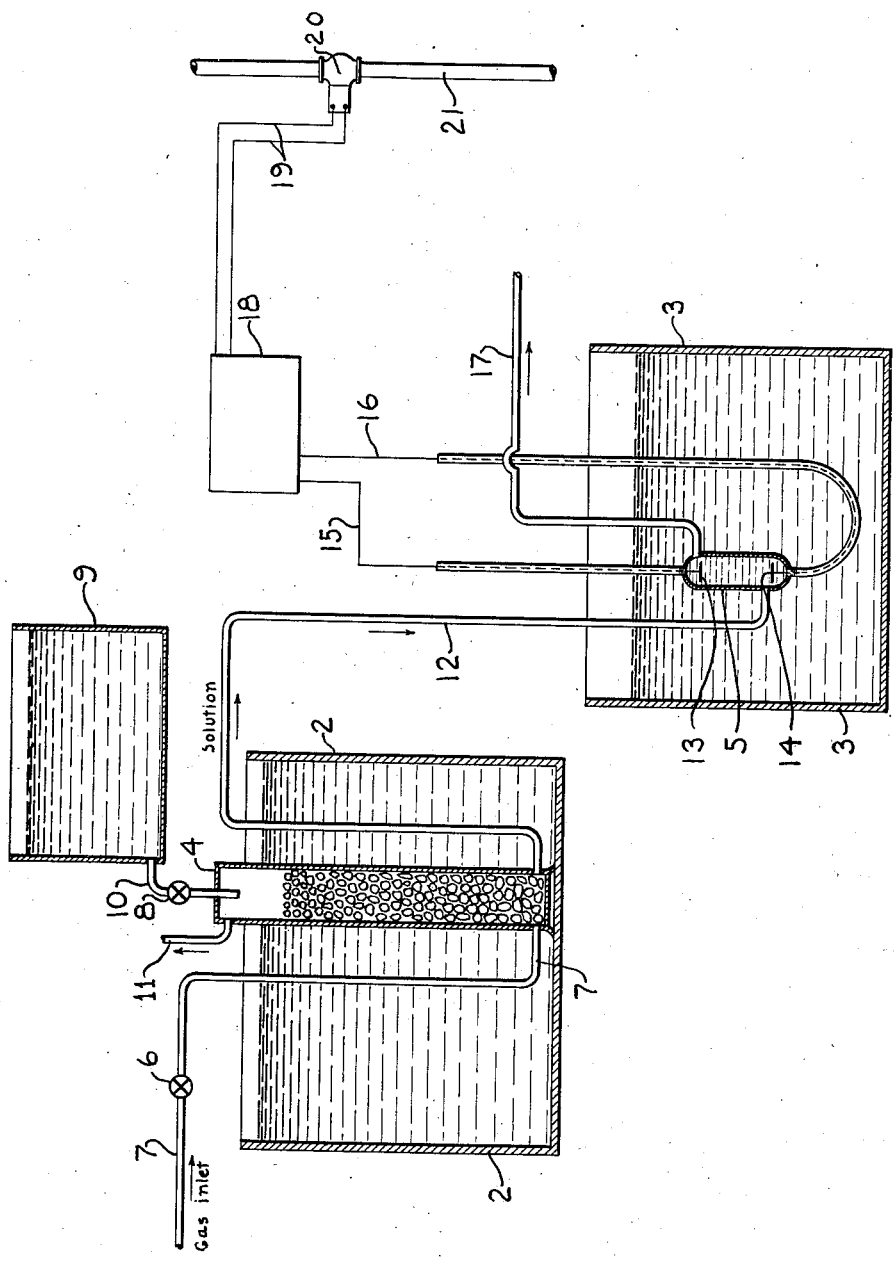
INVENTOR
LeRoy U. Spence
BY
John F. Bergin
ATTORNEY Patented Sept. 5, 1939

2,171,809

UNITED STATES PATENT OFFICE 2,171,809

METHOD OF DETERMINING THE PURITY OF TRIMETHYLAMINE

Le Roy U. Spence, Cheltenham, Pa., assignor to Röhm & Haas Company, Philadelphia, Pa.

Application April 29, 1938, Serial No. 205,119

7 Claims. (Cl. 23—232)

This invention relates to the analysis of trimethylamine and to a method for controlling the operation of processes for separating trimethylamine from mixtures with ammonia and the other methylamines.

In the manufacture of methylamines by the reaction of methanol and ammonia, the crude product obtained after separating water and any unused methanol is a mixture of monomethylamine, dimethylamine, trimethylamine, and some ammonia. The separation of these compounds may be accomplished by such processes as those disclosed in U. S. Patents 2,091,630 and 2,045,929, and in U. S. applications Serial Nos. 75,122 filed April 18, 1936, and 119,199 filed January 6, 1937. In each of these processes the purity of the component separated depends to a large extent upon how closely the process is controlled and unless carefully controlled a relatively impure product is obtained.

The object of this invention is to provide a continuous method for the rapid analysis of trimethylamine during the course of its purification, so that the operation of the processes of separating a pure trimethylamine can be closely controlled. Another object is to provide an automatic method for simultaneously analyzing the trimethylamine produced and for recording and controlling its purity.

The herein disclosed method of accomplishing these objects is based on my previous discovery that within certain temperature limits at a given pressure trimethylamine is the least water soluble component of the above mentioned mixture. In my copending application Serial No. 119,199, filed January 6, 1937, now Patent No. 2,119,474, it is fully disclosed how the water solubility of the three methylamines changes with changes in temperature. In the present invention this discovery is utilized to determine the amount of monomethylamine, dimethylamine, and ammonia that may be present in a purified trimethylamine, by saturating water with the purified material at a temperature at which the trimethylamine is the least soluble basic component in the mixture and measuring the total amount of base in the solution. The concentration of total bases in the solution will depend on the purity of the trimethylamine. If the trimethylamine is pure, the resulting solution is relatively low in total bases, but if ammonia, mono- or dimethylamine is present, the solution is relatively high in total bases. By comparing a property of this solution, such as the electrical conductivity, pH, density, refractive index, etc., with that of solutions prepared from known mixtures, the concentration of the trimethylamine in the sample can be determined. The comparison of electrical conductivities is preferred because of the simplicity of the measurement and because this property changes more rapidly with changes in the purity of the trimethylamine than do other properties which might be measured.

The following table gives the approximate solubilities of ammonia and the methylamines in water at atmospheric pressure and at various temperatures.

| Temperature, °C | Solubility in mol, percent | | | |
|---|---|---|---|---|
| | Trimethylamine | Ammonia | Monomethylamine | Dimethylamine |
| 90 | 0.3 | 3.0 | 3.5 | 2.0 |
| 80 | .8 | 6.0 | 8.0 | 4.5 |
| 70 | 1.5 | 10.0 | 13.0 | 8.0 |
| 60 | 2.5 | 14.5 | 18.2 | 12.7 |
| 50 | 3.7 | 19.2 | 24.0 | 21.3 |
| 40 | 6.5 | 23.6 | 30.0 | 36.5 |
| 30 | 15.0 | 28.6 | 36.8 | 55.5 |
| 25 | 24.0 | 31.5 | 40.5 | 65.0 |
| 20 | 40.0 | 34.2 | 44.5 | 75.0 |

Thus, at temperatures down to 25° C. trimethlamine is less soluble in water than ammonia, monomethylamine or dimethylamine. At 20° C. trimethylamine is more soluble than ammonia but less soluble than monomethylamine and dimethylamine.

The concentration of bases in the solution prepared by absorbing a mixture of gases in water can be roughly calculated from the solubility of each pure component and the composition of the mixture. Thus, if water at 50° C. is saturated with trimethylamine at one atmosphere pressure, the solution would contain about 11.2% of trimethylamine by weight or 1.77 mols per liter. If the trimethylamine contains 2 mol percent of dimethylamine, the saturated solution would contain 11.8% of amines, or 1.93 mols per liter. Such a difference can easily be detected by titration, density, pH measurement, electrical conductivity, or measurements of other physical properties of the two solutions. In the determination of concentrations by the measurement of electrical conductivity, the concentration of the ions in the solution rather than the concentration of total bases is important, and, since monomethylamine and dimethylamine are stronger bases than trimethylamine, the presence of small amounts of monomethylamine and dimethylamine in the solution has a great effect on the conductivity and may be detected without difficulty. The following table gives the published data on the dissociation constants at 25° C. (Handbook of Chemistry, by Lange, 1937, pp. 1158-9, Handbook Publishers, Inc., Sandusky, Ohio).

*Dissociation constants*

| | |
|---|---|
| Ammonia | $1.8 \times 10^{-5}$ |
| Monomethylamine | $50.0 \times 10^{-5}$ |
| Dimethylamine | $74.0 \times 10^{-5}$ |
| Trimethylamine | $7.4 \times 10^{-5}$ |

The effect of temperature on these dissociation constants is not well known except in the case of ammonia, so the calculation of the conductivity of the solutions is not very reliable. It is best, therefore, to calibrate the apparatus with mixtures of known composition in the range of concentration of the mixtures to which the measurements are to be applied.

It is also advisable to use temperatures above 40° C., e. g. 40° to 90° C., since at the lower temperatures the solubility of trimethylamine changes more rapidly with temperature, and small variations in temperature cause a larger error. The more dilute solutions are also easier to work with and come to equilibrium faster if the composition of the mixture being analyzed changes.

It has been found that more reliable results are obtained if the conductivity is measured at a lower temperature than that at which the water was saturated. When measurements are made at the temperature of saturation, erratic results are obtained.

For a more detailed description of the invention reference is made to the accompanying drawing, which is a vertical section of suitable apparatus.

Referring to the drawing, the apparatus consists of two thermostatically controlled baths 2 and 3 which are maintained at different temperatures and placed at different levels as shown. One of them contains a packed absorption tower 4 and the other a conductivity cell 5. A valve 6 regulates the flow of the sample of trimethylamine through tube 7 into the base of the absorption tower. Another valve 8 regulates the quantity of water which is admitted from container 9 through tube 10 into the top of the tower 4. A vent 11 is provided to permit unabsorbed gases to leave the absorption tower. The saturated liquid is conducted from the tower 4 to the conductivity cell 5 by means of tube 12. Electrodes 13 and 14 are provided which are connected by the wires 15 and 16 respectively, to any convenient conductivity-recording apparatus 18. The amount of liquid in the tower 4 is determined by the elevation of the tube 17 which is connected to the conductivity cell 5. The recording apparatus may be of a type identified as a conductivity-recorder made by the Leeds & Northrup Company, of Philadelphia, and consists of the usual self-balancing alternating current Wheatstone bridge. If desired, the conductivity recorder may be provided with adjustable maximum and minimum electrical contacts which are suitably connected to a magnetically operated control valve for the apparatus in which the trimethylamine is being purified. As the purity of the trimethylamine in each of the aforementioned processes of separation may be controlled by adjusting the fraction of the input being withdrawn as purified product such a valve is conveniently located in the gas exit line of the separating apparatus. In the drawing this exit pipe is represented by pipe 21.

The control valve 20 therein is connected to the conductivity recorder 18 through wires 19 and moves to permit the passage of more or less purified trimethylamine from the separation apparatus as the conductivity recorder shows maximum and minimum purity respectively.

In the operation of the apparatus, the thermostatic bath 2 is held at a substantially constant temperature, e. g. 55° C. ±0.025°, and the bath 3 is held at a lower constant temperature, e. g. 50° C. ±0.025°. The valve 8 is opened to allow water to run into the tower 4 at a desired rate. The valve 6 is opened sufficiently to admit the gaseous trimethylamine into the tower at a rate greater than that necessary to saturate the water admitted to the top of the tower. When sufficient solution is collected in the tower 4, the conductivity cell 5 is filled by any convenient means. Once the tube 12 and cell 5 are filled, the height of the liquid in the tower 4 is automatically maintained by the position of tube 17. There is a continuous flow of saturated solution through the cell 5. The conductivity is measured and recorded by the conductivity recorder 18 attached to the leads 15 and 16. The scale on the instrument may be calibrated to read directly in percent trimethylamine. In accordance with the measurements made, an opening or a closing motion is imparted to the valve 20, which controls the rate of removal of the purified trimethylamine from the apparatus. Since the purity of the trimethylamine removed increases with a decrease in the rate of removal, other conditions remaining constant, very close control of the purity may be obtained by proper control of this valve.

The following results, obtained with known mixtures of dimethylamine and trimethylamine in apparatus similar to that described, illustrate the large decrease in resistance brought about by an increase in the amount of impurities present.

| Weight percentage of trimethylamine | Cell resistance |
|---|---|
| | *Ohms* |
| 98.6 | 456 |
| 95.6 | 362 |
| 94.2 | 323 |
| 91.7 | 301 |
| 89.1 | 291 |
| 85.0 | 282 |

The decrease in conductivity brought about by an increase in the purity of trimethylamine is very rapid in the range of 95% to 100%, and, since in these separation processes it is usual to separate trimethylamine of high purity, it is evident that most of the measurements will fall in this range and the sensitivity will therefore be quite high.

If both monomethylamine and dimethylamine are present in the trimethylamine, the conductivity differs but slightly from that of a trimethylamine of equal purity, but which contains only dimethylamine as an impurity. Any difference can be taken care of by calibration with typical mixtures obtained from the particular separation process used. The presence of small amounts of water vapor or inert gases in the sample of trimethylamine also has but little effect on the reading, which is approximately the same as if the sample were anhydrous. The presence of carbon dioxide or other acidic gases in the sample must be avoided, however, for these dissolve in the water to form salts which have a very great effect on the conductivity because they are practically completely ionized. These can be removed from the gas stream, if present, by any suitable absorbent before passing the sample into contact with the water.

The change in electrical conducity with purity is not great when ammonia is the impurity present in the trimethylamine, because the dissociation of ammonia is much less than that of dimethylamine, but the differences in the range of 95% to 100% are still large enough to make the method very useful in the rapid analysis of such mixtures.

In the process of U. S. Patent 2,091,630, for example, ammonia and trimethylamine are separated by scrubbing with water in a tower in which the mixture runs countercurrent to the water. In one case, when the control was adjusted for trimethylamine with an average purity of 98%, it was found that 92% of the trimethylamine in the crude mixture was recovered. When the adjustments were set so as to obtain trimethylamine of 97% purity, a 95% yield was obtained, and when the purity was increased to 98.5%, 90% of the trimethylamine input was recovered.

I claim:

1. A process for the rapid determination of the quantity of basic impurities in gaseous trimethylamine, which comprises saturating water with the gaseous trimethylamine at a temperature at which the trimethylamine is less soluble than the basic impurities and measuring the electrical conductivity of the resulting solution.

2. A process for the rapid determination of the quantity of basic impurities in gaseous trimethylamine, which comprises saturating water with the gaseous trimethylamine at a temperature at which the trimethylamine is less soluble than the basic impurities, measuring the electrical conductivity of the resulting solution, and comparing it with that of a solution saturated under identical conditions with trimethylamine containing known amounts of similar impurities, said measurement being made at a temperature lower than that at which the saturated solution was prepared.

3. A process for continuously determining the quantity of basic impurities in gaseous trimethylamine which comprises continuously forming a saturated aqueous solution of the trimethylamine in a countercurrent absorbing system at a temperature at which the trimethylamine is less soluble than the basic impurities, reducing the temperature of the solution, passing it continuously through a conductivity cell and measuring the electrical conductivity of the solution.

4. A process for continuously determining the quantity of basic impurities in gaseous trimethylamine which comprises continuously forming a saturated aqueous solution of the trimethylamine in a countercurrent absorbing system at a temperature between 40° and 90° C., reducing the temperature of the solution approximately five degrees, passing it continuously through a conductivity cell and measuring the electrical conductivity of the solution.

5. In a process for controlling the amount of basic impurities during the purification of a trimethylamine, the step which comprises continuously analyzing the purified product by forming a saturated solution of the trimethylamine in a counter-current absorbing system at a temperature at which the trimethylamine is less soluble than the basic impurities, reducing the temperature of the solution, passing it continuously through a conductivity cell, measuring the electrical conductivity of the solution, and regulating the flow of the trimethylamine from the purification apparatus in accordance with said measurements.

6. In a process for automatically controlling the amount of basic impurities during the purification of trimethylamine, the steps which comprise withdrawing a portion of the purified trimethylamine gas from the purification apparatus, continuously forming a saturated, aqueous solution of the trimethylamine at a temperature at which the trimethylamine is less soluble than any basic impurities, reducing the temperature of the solution, measuring the conductivity of the solution, and regulating the flow of the trimethylamine from the purification apparatus in accordance with said measurement.

7. In a system for purification of trimethylamine, means for forming a saturated aqueous solution of a sample of the purified mixture, such means including a countercurrent absorbing tower, means for continuously measuring the electrical conductivity of the saturated solution formed, and means controlled by the measuring means for controlling the flow of the trimethylamine from the purification apparatus in accordance with said measurement.

LE ROY U. SPENCE.